(12) United States Patent
Chen

(10) Patent No.: US 6,796,544 B1
(45) Date of Patent: Sep. 28, 2004

(54) VALVE MOUNT FOR WATER SAVING CORE SHAFT OF SINGLE HANDLED FAUCET

(75) Inventor: Mei-Li Chen, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 0 days.

(21) Appl. No.: 10/455,326

(22) Filed: Jun. 6, 2003

(51) Int. Cl.⁷ .............................................. F16K 11/00
(52) U.S. Cl. ..................... 251/205; 251/284; 251/297; 137/625.17; 137/801
(58) Field of Search ............................ 251/205, 284, 251/297; 137/625.17, 801

(56) References Cited

U.S. PATENT DOCUMENTS

| | | | | |
|---|---|---|---|---|
| 5,522,429 A | * | 6/1996 | Bechte et al. ................ | 251/297 |
| 5,538,041 A | * | 7/1996 | G anzle ................. | 137/625.17 |
| 5,899,230 A | * | 5/1999 | Orlandi ................. | 137/625.17 |
| 6,170,523 B1 | * | 1/2001 | Chang ................... | 137/625.17 |

* cited by examiner

Primary Examiner—John Bastianelli
(74) Attorney, Agent, or Firm—Troxell Law Office PLLC

(57) ABSTRACT

A valve mount for water saving core shaft of a single-handled faucet has a valve embodiment housed in a receiving cavity of a faucet body with the upper section provided with internal threads to be in locking engagement with a locking cap. In the valve chamber of the valve embodiment are housed sequentially a rotary member, a switch stick, a regulation seat and a discharge control valve. The inner periphery of the valve chamber is provided with a plurality of retaining recesses corresponding to the spring plates defined on the rear cavities of the rotary member and the engaging teeth of the regulation seat are in engagement with the spring plates on the right and left recess of the rotary member. On the upper section of the rotary seat are provided with outer teeth which are engaged with the inner teeth of a stop member. The upper end of the switching stick is secured a faucet handle whereby the handle of such a faucet can be move up and also to the right or left in a step-like manner to precisely control the minimum outlet of cold and hot water without worrying the sudden massive discharge of water due to an improper actuation of the handle, resulting in the effective use of water.

1 Claim, 5 Drawing Sheets

VALVE MOUNT FOR WATER SAVING CORE SHAFT OF SINGLE HANDLED FAUCET

BACKGROUND OF THE INVENTION

A valve mount for a water saving core shaft of a single-handled faucet has a valve embodiment housed in a receiving cavity of a faucet body with the upper section provided with internal threads to be in locking engagement with a locking cap. In the valve chamber of the valve embodiment are housed sequentially a rotary member, a switch stick, an regulation seat and a discharge control valve. The inner periphery of the valve chamber is provided with a plurality of retaining recesses corresponding to the spring plates defined on the rear cavities of the rotary member and the engaging teeth of the regulation seat are in engagement with the spring plates on the right and left recess of the rotary member. On the upper section of the rotary seat are provided with outer teeth which are engaged with the inner teeth of a stop member. The upper end of the switching stick is secured a faucet handle whereby the handle of such a faucet can be move up and also to the right or left in a step-like manner to precisely control the minimum outlet of cold and hot water without worrying the sudden massive discharge of water due to an improper actuation of the handle, resulting in the effective use of water.

Referring to FIG. 1, the prior art is perspectively shown of its exploded components. The faucet 10 is equipped with a faucet body 11 having a housing chamber 111 in which a valve embodiment 12 is received. In the valve chamber 121 of the valve embodiment 12 are sequentially placed a regulating seat 13 and a water outlet control valve 14 that are operated in cooperation to control the opening and closing of the supply of the cold and hot water. A limiting member 15 having internal retaining recesses 151 is in engagement with the regulating seat 131 having outer retaining recesses 13 so as to permit the two components to be rotated together. A locking ring 16 is in locking engagement with the valve embodiment 12 by way of the inner threads 112 so as to make the valve embodiment 12, the regulating seat 13, the water outlet control valve 14 and the limiting member 15 confined in the housing chamber 111. A faucet handle 17 is fixed to the switching control stick 132 of the regulating seat 13. In operation, as the faucet handle 17 is pried upwardly and placed at the center, the control stick 132 and the water outlet control valve 14 are driven to move accordingly and the amount of water discharge depends on the level of the upward pivot of the faucet handle 17. As the faucet handle 17 is pried upwardly and pivoted to the right or left, the limiting member 15 in engagement with the regulating seat 13 is made to rotate, causing the water outlet control valve 14 to regulate the discharge of cold and hot water.

Such a prior art has a disadvantage in practical use given as follows.

The faucet 10 controls the discharge of water in a stageless manner, so water is easily discharged in a large amount due to a user prying the faucet handle 17 directly upwardly to its limit. As a result, large amount of water will be instantly wasted if the faucet handle 17 is not able to be carefully operated in one aspect and the water will be easily spattered all around to get the user's clothes wet.

SUMMARY OF THE INVENTION

Therefore, the primary object of the present invention is to provide a valve mount for a water saving core shaft for a single handled faucet wherein the upwardly pivoted faucet handle can cause the control stick to drive a regulation seat to spin forwardly, resulting in the movement of an upper switching valve. The spring plates housed in recesses of on a rotary member will fall into sequential registration with teeth of the regulation seat whereby the stepwise control of water discharge can prevent sudden large amount of water from being discharged with the prying movement of the faucet handle, effecting water saving in operation.

Another object of the present invention is to provide a valve mount for a water saving core shaft for a single handled faucet wherein as the faucet handle is moved to the right or left, a rotary member is rotated accordingly whereby a spring plate confined in a recess of the rotary member can be in stepwise registration with snap cavities in the valve embodiment, resulting in the precise control of discharge of cold and hot water in a minimum amount.

DETAILED DESCRIPTION OF THE PREFERRED EMBODIMENT

Figure 1:
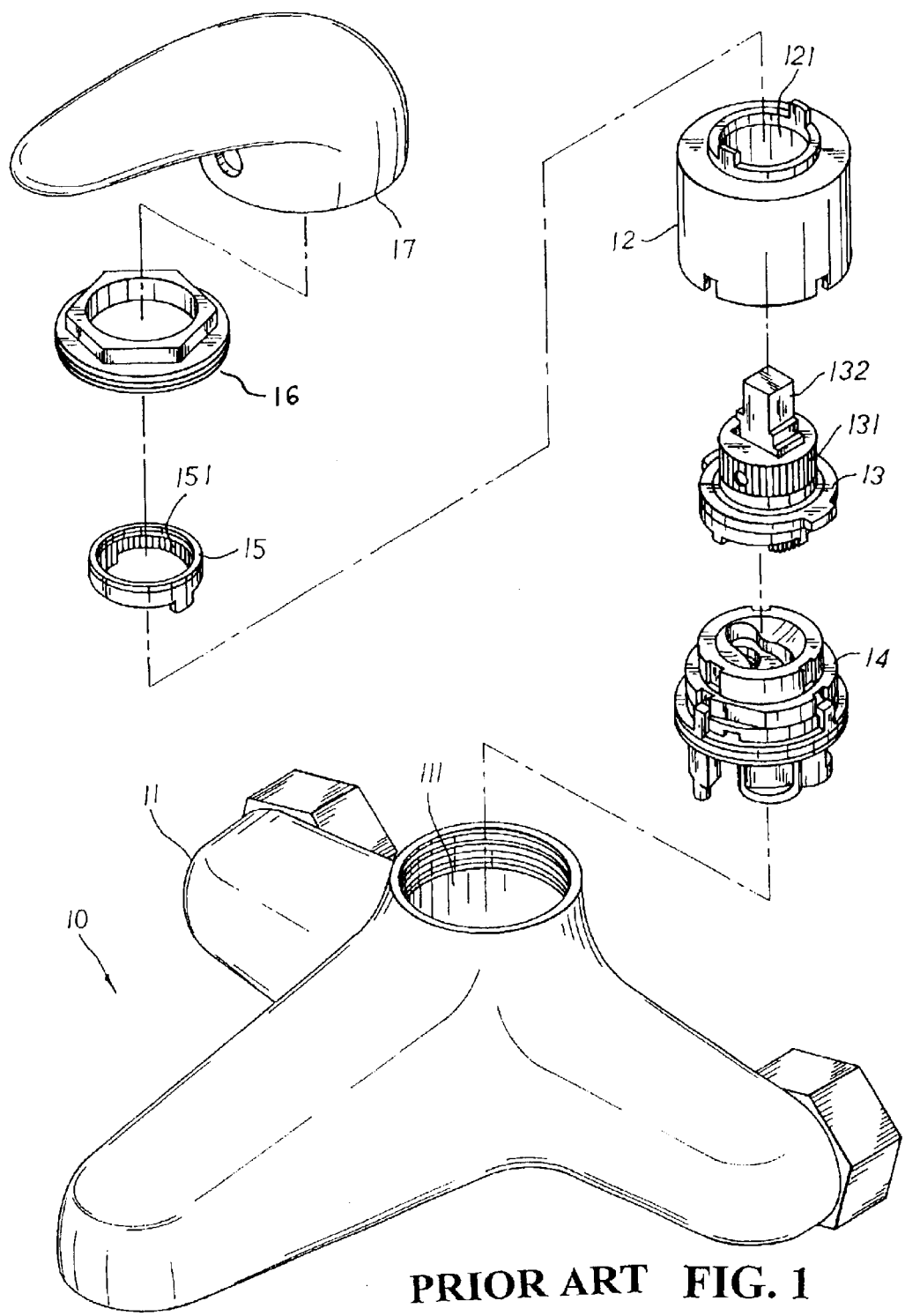
FIG. 1 is a perspective diagram showing the exploded components of a prior art.
Figure 2:
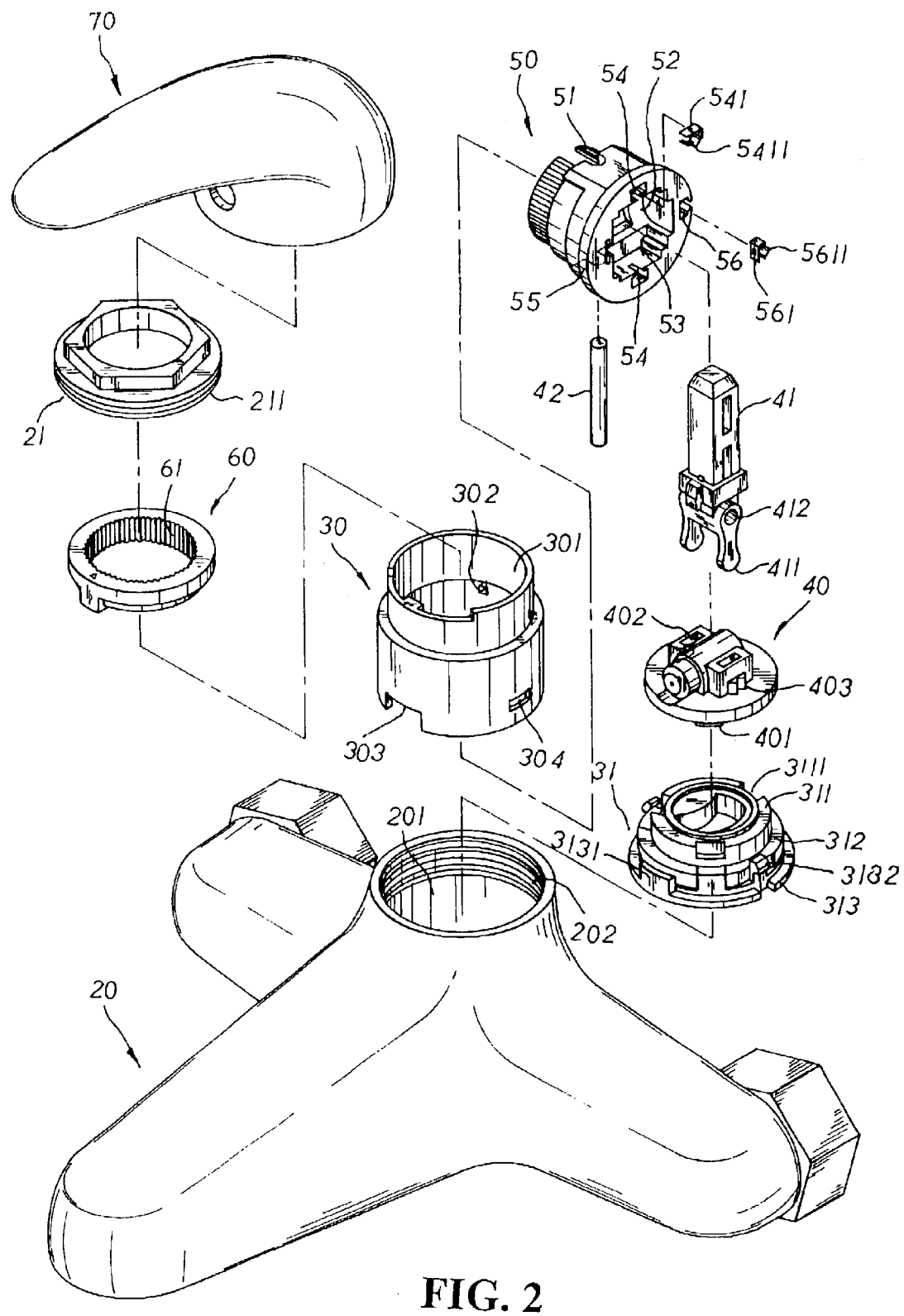
FIG. 2 is a perspective diagram showing the exploded components of the present invention.

Referring to FIG. 2, the perspective diagram of the exploded components of the present invention comprises a faucet mount 20, a locking cap 21, a valve embodiment 30, a water outlet control valve 31, a regulation seat 40, a control stick 41, a rotary member 50, a limiting piece 60 and a faucet handle 70. A housing cavity 201 is disposed at the center of the rear portion of the faucet mount 20 and are in communication with the water inlet and outlet passages. On the inner peripheral surface at the top of the housing cavity 201 are disposed retaining threads 202 with which the outer threads 211 of the locking cap 21 to be removably engaged. The tubular valve embodiment 30 made in a stepwise form with a shoulder defined at the stepwise joint has an internal chamber 301. At the middle of the inner wall of the internal chamber 301 are disposed a plurality of snap cavities 302. On the bottom edge of the valve embodiment 30 are placed a plurality of insertion recesses 303 and retaining through holes 304 on the bottom wall.

The water outlet control valve 31 has an upper switching valve 311 having a registration cavity 3111 on the top and a lower switching valve 312 at the middle thereof and at the bottom is defined a switching base 313 on which are disposed a plug block 3131 and a buckle extension 3132 in an alternating manner. The regulation seat 40 is provided with a plurality of retaining projections 401 at the bottom and a pair of projected registration cavities 402 on the top. On the outer wall of the respective projected registration cavity 402 is disposed a locking tooth 403.

The control stick 41 mounted in combination with the faucet handle 70 has a pair of symmetric plug sticks 411 each having an engagement through hole 412 on the top end with which a fixing pin 42 is engaged.

The rotary member 50 has an outer locking teeth 51 registrable with the inner locking teeth 61 of the limiting piece 60. A pair of reverse U-shaped stop surface 52 are symmetrically defined on the inner wall of the rotary member 50 the bottom of which is provided with a receiving cavity 53 in cooperation with the top of the regulation seat 40. On the top and bottom edge of the receiving cavity 53 is symmetrically disposed a left and right recess 54 in which is housed a spring plate 541 having a retaining corner 5411 at one side just extending into the receiving cavity 53. A stop flange 55 defined at the bottom of the rotary member 50 has a rear recess 56 disposed at an outer side thereof with a spring plate 561 housed therein. A limiting corner 5611 defined at one side of the spring plate 561 just sticks out and abuts against the stop flange 55.

In assembly, the rotary member 50 is first put into the internal chamber 301 of the valve embodiment 30, leading from the bottom thereof. with the stop flange 55 of the rotary member 50 in abutment against an inner shoulder (not shown) of the internal chamber 301. Then the control stick 41 is led from the bottom of the rotary member 50 and into the receiving cavity 53 of the same until the top end of the plug sticks 411 comes into contact with the reverse U-shaped stop surface 52 and then the fixing pin 42 is led into the engagement through hole 412 from one side of the stop surface 52 of the rotary member 50. Now the control stick 41 is fixed to the rotary member 50.

Figure 3:
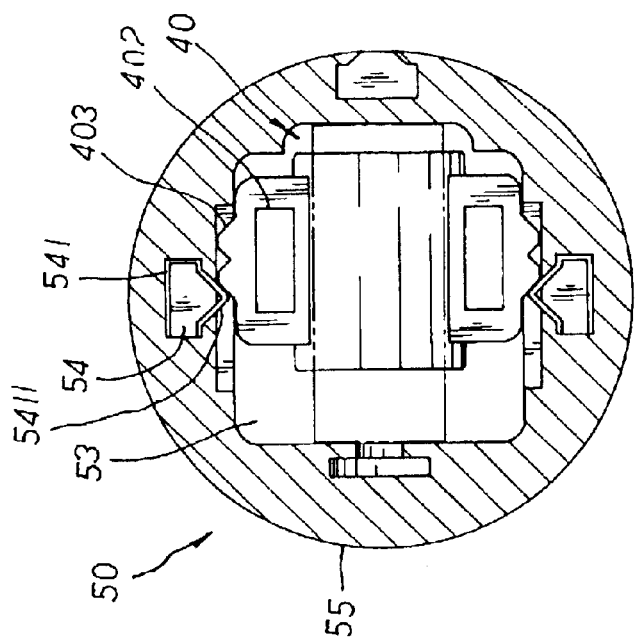
FIG. 3 is a sectional diagram showing the assembly of the regulating seat and the rotary member of the present invention.
Figure 4:
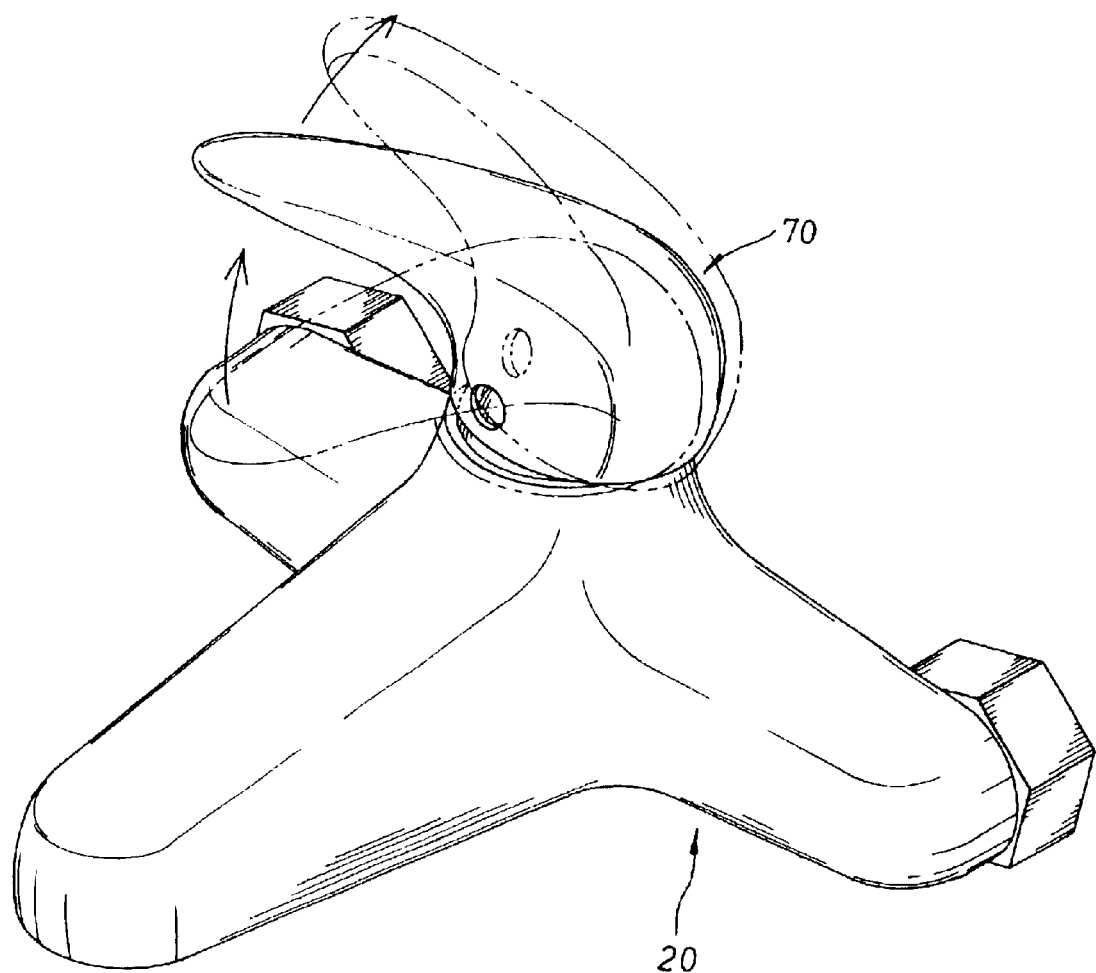
FIG. 4 is a sectional diagram showing the stepwise upward pivot of the faucet handle.

Next, the plug sticks 411 of the control stick 41 are registered with the projected registration cavities 402 of the regulation seat 40. At then, the top section of the regulation seat 40 is accommodated in the receiving cavity 53 of the rotary member 50. In the meanwhile, the retaining corners 5411 of the spring plates 541 housed in the left and right recess 54 become engaged with a front portion of the locking tooth 403, as shown in FIG. 3. Then, the retaining projections 401 of the regulation scat 40 are registered with the registration cavities 3111 of the switching valve 31; and the rotary member 50 is engaged with the limiting piece 60 by registering the locking teeth 61 with the locking teeth 51 and then the locking cap 21 is secured to the faucet mount 20 by engaging the outer threads 211 of the locking cap 21 with the inner threads 202 of the faucet mount 20. Afterwards, the faucet handle 70 is in locking engagement with the control stick 41 as shown in FIG. 4 to complete the assembly.

Figure 5:
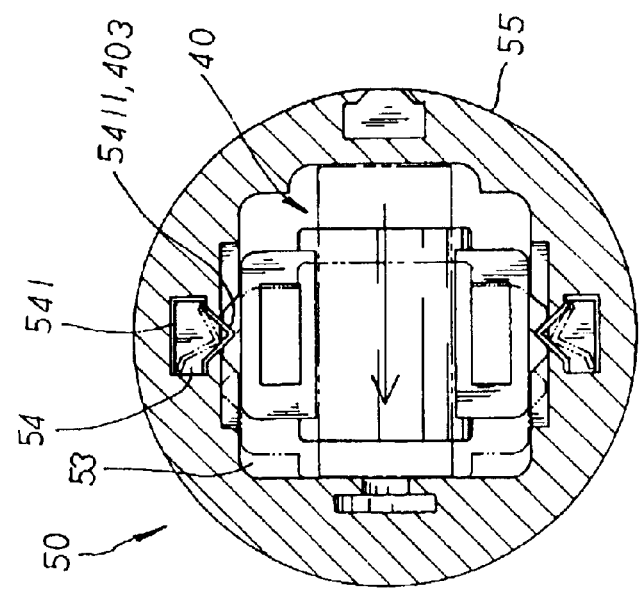
FIG. 5 is a diagram showing the operational mode of the regulating seat and the rotary member of the present invention.
Figure 6:
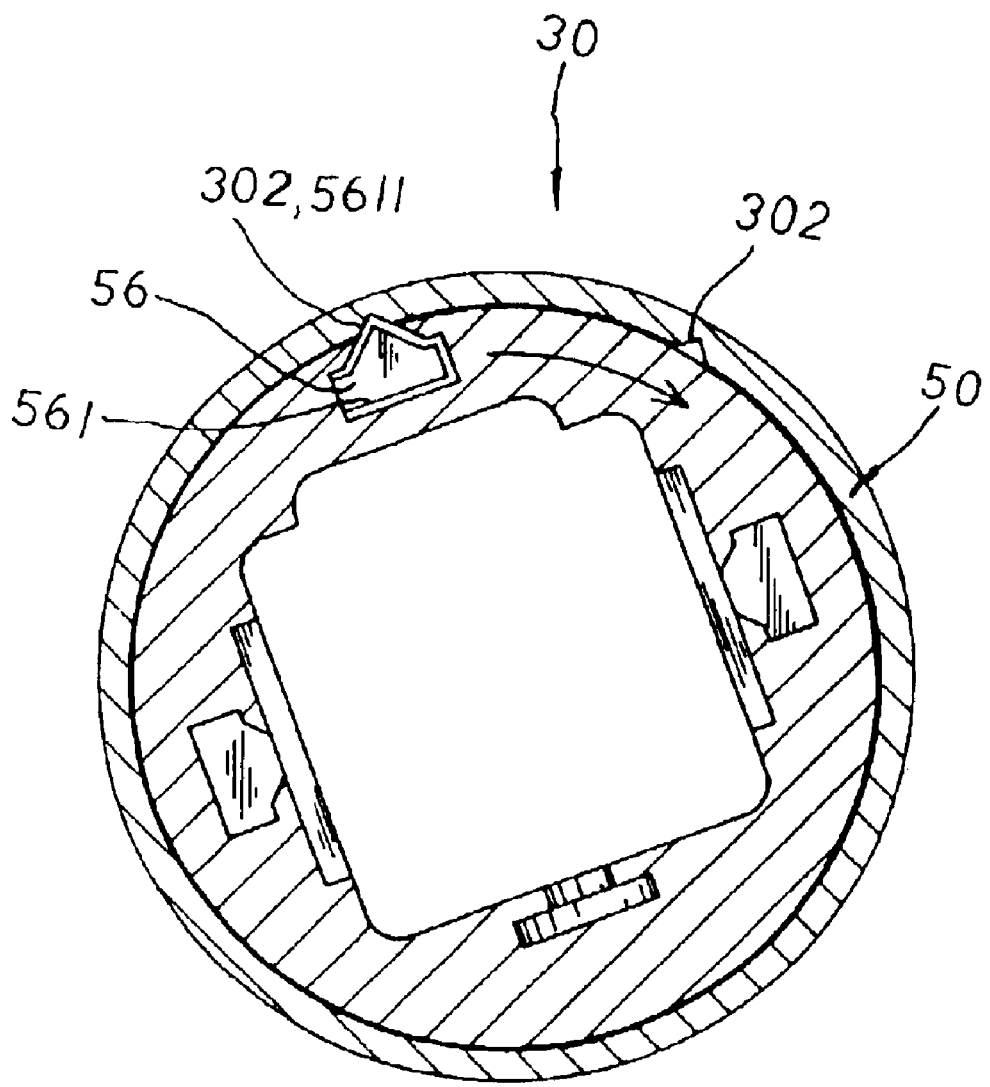
FIG. 6 is a diagram showing the rotary member and the valve embodiment of the present invention in operation.

As the faucet handle 70 is pried upwardly, the control stick 41 will drive accordingly the regulation seat 40 to rotate forwardly the upper switching valve 311 of the switching valve 31; at this moment, the spring plate 541 housed in the right and left recesses 54 of the rotary member 50 will move in response to the span of the movement of the regulation seat 40, the retaining corner 5411 of each spring plate 541 will sequentially come into registration with the locking tooth 403 in a stepwise manner, as shown in FIG. 5 so as to effect precise regulation of the amount of water discharge. It can avoid sudden discharge of large amount of water as the faucet handle 70 is violently pried upwardly, resulting in the saving of water source. When the faucet handle 70 is rotated to the left or right, the rotary member 50 will be driven to spin clockwisely or counter-clockwisely as a result. At the moment, the limiting corner 5611 of the spring plate 561 housed in the rear recess 56 of the rotary member. 50 will fall into registration with one of the snap cavities 302 of the tubular valve embodiment 30, as shown in FIG. 6 to precisely control the minimum discharge of cold and hot water.

What is claimed is:

1. A valve mount for the water saving core shaft of a single-handled faucet, comprising:

a faucet mount, a locking cap, a valve embodiment, a water outlet control valve, a regulation seat, a control stick, a rotary member, a limiting piece and a faucet handle; wherein a housing cavity is disposed at the center of a rear portion of said faucet mount and are in communication with water inlet and outlet passages inside thereof; on an inner peripheral surface at the top of said housing cavity are disposed retaining threads with which outer threads of said locking cap are removably engaged; said tubular valve embodiment made in a stepwise form has an internal chamber; on the bottom edge of said valve embodiment are placed a plurality of insertion recesses and retaining through holes on a bottom wall that are registered with a plug block and a buckle extension in an alternating manner of a switching base respectively;

said tubular valve embodiment has at the middle of an inner wall of said internal chamber are disposed a plurality of snap cavities; said water outlet control valve has an upper switching valve having a registration cavity on the top and a lower switching valve at the middle thereof and at the bottom is defined a switching base on which are disposed a plug block and a buckle extension in an alternating manner; said regulation seat is provided with a plurality of retaining projections at a bottom and a pair of projected registration cavities on the top; on the outer wall of said respective projected registration cavity is disposed a locking tooth;

said control stick mounted in combination with said faucet handle has a pair of symmetric plug sticks each having an engagement through hole on the top end with which a fixing pin is engaged;

said rotary member has an outer locking teeth registrable with the inner locking teeth of the limiting piece; a pair of reverse U-shaped stop surface are symmetrically defined on the inner wall of said rotary member the bottom of which is provided with a receiving cavity in cooperation with the top of said regulation seat; on the top and bottom edge of the receiving cavity is symmetrically disposed a left and right recess in which is housed a spring plate having a retaining corner at one side just extending into the receiving cavity; a stop flange defined at the bottom of said rotary member has a rear recess disposed at an outer side thereof with a spring plate housed therein; a limiting corner defined at one side of said spring plate just sticks out and abuts against said stop flange;

said rotary member is put into said internal chamber of said valve embodiment with said stop flange of said rotary member in abutment against an inner shoulder of said internal chamber; said control stick is led from the bottom of said rotary member and into a receiving cavity of the same until the top end of said plug sticks comes into contact with said reverse U-shaped stop surface and then the fixing pin is led into the engagement through hole from one side of the stop surface of said rotary member so as to fix said control stick to said rotary member;

said plug sticks of said control stick are registered with the projected registration cavities of said regulation seat which is accommodated in the receiving cavity of said rotary member; said retaining corners of said spring plates housed in said left and right recess become engaged with a front portion of the locking tooth; said retaining projections of said regulation seat are registered with said registration cavities of said switching valve; and said rotary member is engaged with the limiting piece and then said locking cap is secured to said faucet mount; said faucet handle is in locking engagement with said control stick to complete the assembly, whereby as said faucet handle is pried upwardly, said control stick will drive accordingly said regulation seat to rotate forwardly the upper switching valve of said switching valve; at this moment, said spring plates housed in the right and left recesses of said rotary member will move in response to the span of the movement of said regulation seat, the retaining corner of each said spring plate will sequentially come into registration with said locking tooth in a stepwise manner so as to effect precise regulation of the amount of water discharge; when said faucet handle is rotated to the left or right, said rotary member will be driven to spin clockwisely or counter-clockwisely as a result; then, said limiting corner of said spring plate housed in the rear recess of said rotary member will fall into registration with one of the snap cavities of said tubular valve embodiment to precisely control the minimum discharge of cold and hot water.

\* \* \* \* \*